United States Patent [19]

Heller

[11] Patent Number: 4,986,400

[45] Date of Patent: Jan. 22, 1991

[54] BI-DIRECTIONAL SPRING CLUTCH FOR REDUCING WORM GEAR DRIVE

[75] Inventor: Werner H. Heller, West Valley, N.Y.

[73] Assignee: Peerless-Winsmith, Inc., Springville, N.Y.

[21] Appl. No.: 340,932

[22] Filed: Apr. 20, 1989

[51] Int. Cl.$^5$ .................... F16D 13/02; F16D 13/08
[52] U.S. Cl. .................... 192/26; 192/41 S; 192/48.92; 192/81 C
[58] Field of Search .................. 192/26, 33 C, 41 S, 192/48.92, 81 C, 51, 12 BA

[56] References Cited

U.S. PATENT DOCUMENTS

| | | | |
|---|---|---|---|
| 2,742,126 | 4/1956 | Morton | 192/41 S |
| 3,304,793 | 2/1967 | Nishimara | 192/51 X |
| 3,321,986 | 5/1967 | Chappel et al. | 192/48.92 X |
| 3,361,235 | 1/1968 | Sacchini | 192/41 S X |
| 3,990,554 | 11/1976 | Lowery | 192/26 |
| 4,364,286 | 12/1982 | Ciolli | 192/48.92 X |
| 4,372,432 | 2/1983 | Waine et al. | 192/41 S X |
| 4,433,765 | 2/1984 | Rude et al. | 192/41 S |
| 4,825,988 | 5/1989 | Nishimura | 192/12 BA |

FOREIGN PATENT DOCUMENTS 755405 11/1933 France .
53-13049 2/1978 Japan .

*Primary Examiner*—Richard Lorence
*Attorney, Agent, or Firm*—Kirkpatrick & Lockhart

[57] ABSTRACT

Bi-direction spring clutch apparatus for a reducing worm gear drive is disclosed. The bi-directional spring clutch apparatus includes a worm gear drive comprised of a worm and an output shaft rotatably mounted in a housing. A worm gear is rotatably mounted coaxially about the output shaft so that its teeth mesh with the threads of the worm. The worm gear includes two coaxial extensions which are also rotatably mounted coaxially about the output shaft but which are rotatably fixed relative to the worm gear. Located adjacent to each of the coaxial extensions of the worm gear are two torque transfer bushings. These are of the same outside diameter as the coaxial extensions, but are rotatably fixed relative to the output shaft. Stretched over each of the torque transfer bushing/coaxial extension pairs is a wound spring, each of the same hand of winding, and each having sufficient revolutions to result in self-locking of the torque transfer bushing/coaxial extension pairs. The end of each spring is bent radially outward to form a tang which projects through notches located in a cylindrically shaped control sleeve rotatably mounted coaxially about each spring. The control sleeves have a radial flange into which are machined radially spaced notches. By rotationally controlling the control sleeves, the wound springs can be permitted to lock up the torque transfer bushing/coaxial extension pairs or they can be prevented from doing so regardless of whether torque is being applied to the worm or to the output shaft.

10 Claims, 4 Drawing Sheets

BI-DIRECTIONAL SPRING CLUTCH FOR REDUCING WORM GEAR DRIVE

BACKGROUND OF INVENTION

1. Field of Invention

The present invention relates to a spring clutch apparatus for a drive mechanism and more particularly, to a bi-directional spring clutch apparatus for a reducing worm gear drive.

2. Description of the Prior Art

In shiftable or reversing gear drives, such as are used in overhead conveyor systems, the driving element is typically engaged and disengaged from the driven element by a mechanically operated, dog-type clutching mechanism which is controlled by an external lever. Although this provides for positive engagement and disengagement, it also frequently results in jerky or uneven starts and stops. Likewise, in order to engage or disengage such mechanisms under load, significant loads on the control lever are often required. This contributes to imprecise movements as well as wear and tear on all parts of the device or machinery to which the drive is connected.

In overhead and other conveyor type drives, particularly those designed for integration into automated or semi-automated manufacturing facilities, there is a need for a clutching mechanism for such drives which is bi-directional and is easily and efficiently engaged and disengaged under load. There is also a need for a clutching mechanism which operates smoothly and precisely while handling heavy loads.

In certain types of drive mechanisms, spring clutches have been used advantageously to engage or disengage a drive element and a driven element with less jerkyness and less effort, particularly when engaged or disengaged under load. A description of the basic operation of spring clutches is set forth in U.S. Pat. No. 4,433,765. An example of a drive mechanism employing a spring clutch of this nature is shown in U.S. Pat. No. 2,742,126. In this example, a plurality of springs are arranged in series in such a way that they begin to transmit torque after slippage, the amount of slippage differing from the first spring to the last, thus allowing the clutch to take up its full torque in smaller increments. French Pat. No. 755,404 shows a simple, single direction spring clutch mechanism used in connection with a worm gear drive.

Likewise, spring clutch mechanisms have been successfully used with bi-directional drives as well. A description of the basic operation of bi-directional spring clutches is set forth in U.S. Pat. No. 4,372,432. In this description, however, only one spring is used.

Application of bi-directional spring clutches to drive mechanisms of various types is shown in U.S. Pat. Nos. 4,364,286, 3,361,235, 3,321,986 and 3,304,793. Japanese Pat. No. 53-13049 is also illustrative. U.S. Pat. No. 4,364,286 shows a bi-directional spring clutch used as a braking mechanism in connection with a pair of epicyclic gear trains. U.S. Pat. No. 3,361,235 shows a bi-directional spring clutch which permits transmission of torque from an input shaft to output shaft, regardless of the direction of rotation of the input shaft, but which prevents transmission of torque from the output shaft to the input shaft. U.S. Pat. No. 3,321,986 shows spring clutches as used in a bi-directional transmission. U.S. Pat. Nos. 3,304,793 shows a bi-directional spring clutch which permits transmission of torque by an input shaft which is driven in either direction of rotation or selectively prevents transmission of torque by the input shaft when a single tang, one from each spring, is interrupted by a stop. Japanese Pat. No. 53-13049 shows a similar arrangement using four (4) springs. This mechanism is also capable of transmitting torque in both directions or not transmitting torque at all, depending on whether a single tang, one on each spring, is engaged by a stop mechanism.

SUMMARY OF THE INVENTION

The present invention provides a bi-directional spring clutch mechanism. The bi-directional spring clutch mechanism of the present invention is advantageous for use with reducing worm gear drives because of the particularly smooth manner in which the drive can be engaged and disengaged when under load. Further, the spring clutch apparatus of the present invention is configured so that it can be selectively engaged or disengaged regardless of whether there is a torque or load being applied to the driving gear or to the driven gears or output shaft, such as from the momentum of the load to which the drive is attached. In addition, the spring clutch apparatus of the present invention can be arranged so that the selective engagement and disengagement can be limited to one direction of rotation independently of the other direction of rotation. Finally, the spring clutch apparatus of the present invention is adaptable to other types of drives, such as reduction gear drives or reduction pulley drives.

The spring clutch apparatus of the present invention includes a worm gear drive which is comprised of a worm and a worm gear rotatably mounted in a housing so that the worm can drive the worm gear when the worm is rotated. The worm gear can rotate in either direction, depending on the direction of rotation of the worm. The worm gear is rotatably mounted coaxially about an output shaft. The worm gear is engaged and disengaged from the output shaft by means of the bi-directional spring clutch of the present invention.

The worm gear of the present invention has a pair of coaxial extensions, one on each side of the worm gear. These are rotatably fixed to the worm gear itself. Mounted on the output shaft on each side of the coaxial extensions of the worm gear are a pair of torque transfer bushings. These are rotatably fixed to the output shaft by a key or spline. The torque transfer bushings have an outside diameter equal to the outside diameter of the worm gear extensions.

Stretched over the worm gear coaxial extensions/torque transfer bushings are a pair of wound springs of the type used in spring clutches. In the apparatus of the present invention, these springs are each of the same hand of winding. The number of revolutions of each spring is equal on each side of the worm gear and are of sufficient number to result in self-locking of the worm gear coaxial extension to the torque transfer bushing next it, depending on the direction of rotation. Thus, when the worm is driven in one direction, the spring on one side of the worm gear locks the worm gear extension/torque transfer bushing on that side together, thus driving the output shaft in that direction. When the worm is driven in the other direction, the spring on the other side of the worm gear locks the worm gear extension/torque transfer bushing on the other side, thus driving the output shaft in the other direction. In other words, when driven in one direction, one spring is locked up, thus driving the output shaft and the other spring slips. When it is desired that the direction of the output shaft be reversed, the worm is driven in the other direction. Now the first spring allows the output shaft to rotate freely, but the second spring locks up, thus driving the output shaft in the desired direction of rotation.

Each of the springs of the present invention is also provided with ends which are radially bent outward to form tangs. Thus, each spring has two tangs, one at each end of the spring. These tangs project through notches in a cylindrically-shaped control sleeve which is rotatably mounted coaxially about the springs which are in turn stretched over the torque transfer bushing/coaxial extensions on each side of the worm gear. The notches in the control sleeve are located and dimensioned so that if the control sleeve rotates freely with the torque transfer bushing/coaxial extension/spring combination, the tangs of the springs are not restrained in any way and the spring clutches then operate in the conventional manner. However, when the control sleeves are rotationally restrained, the edges of the notches therein contact the tangs of the springs, preventing them from locking up the torque transfer bushings/coaxial extensions, thus preventing the transmission of torque from the worm gear to the output shaft, as well as from the output shaft to the worm gear. This is so regardless of the direction of rotation. The control sleeves also contain radially spaced notches into which a bar or other stop means can be inserted by means of a handle or other mechanical device. Alternatively, the guide bar can be slidably mounted in the housing such that when it is slid toward the control sleeves, the ends engage the radially spaced notches in the radial flange of the control sleeve. The guide bar can be moved in and out of engagement with the radially spaced notches in the radial flange of the control sleeve by a cam mounted on a shaft rotatably mounted in the housing and adapted for rotation by means of a handle mounted on the shaft or by means of an electrically powered solenoid. In this way, the worm gear drive of the present invention can be engaged and disengaged selectively by controlling the control sleeves, whether the drive is under load or not and regardless of in which direction the worm is rotating. Likewise, when the worm is stopped, the drive can be disengaged by controlling the control sleeve, thus preventing torque from the output shaft from being transmitted back into the drive. Finally, the control sleeves can be selectively controlled, so as to disengage the drive only in one direction of rotation, but not the other.

Further objects and advantages of this invention will become apparent as the following description and accompanying drawings are considered.

BRIEF DESCRIPTION OF THE DRAWINGS

The present invention can be better understood by reference to the figures in which.

DETAILED DESCRIPTION OF THE PREFERRED EMBODIMENT

Figure 1:
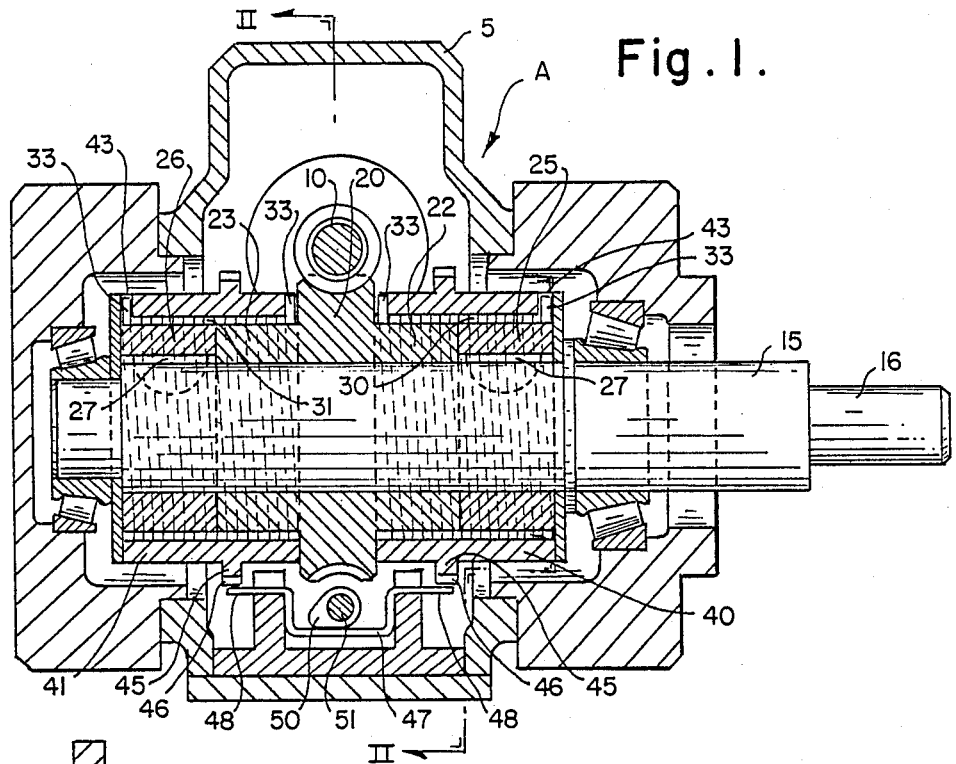
FIG. 1 is a side elevational section of the worm gear drive as viewed from a direction perpendicular to the output shaft.
Figure 2:
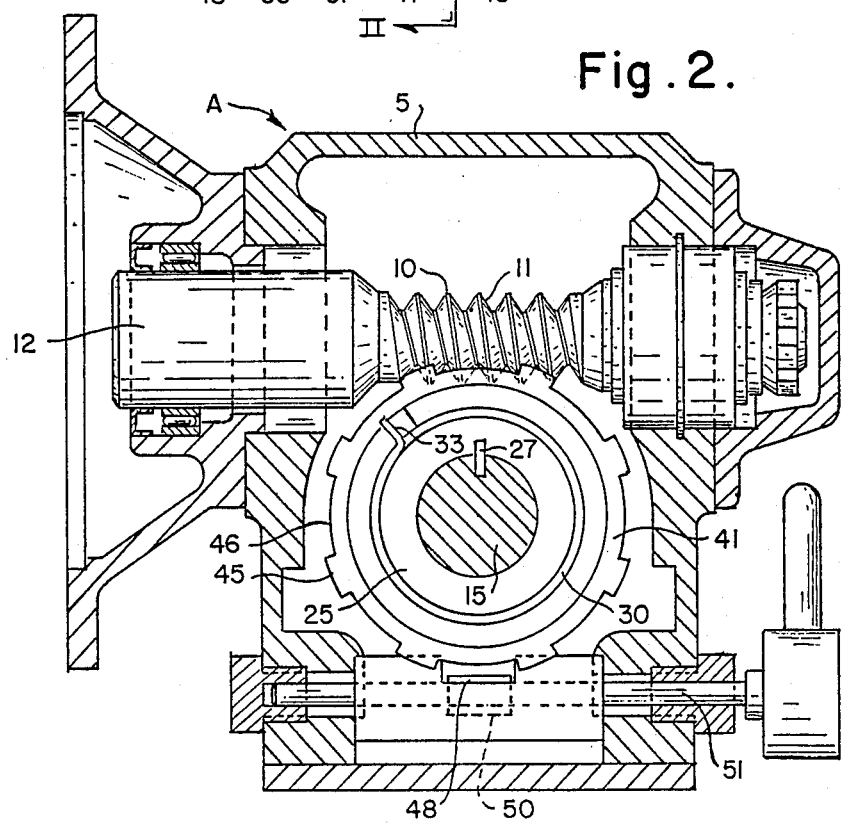
FIG. 2 is a side elevational view from a direction perpendicular to the worm.
Figure 3:
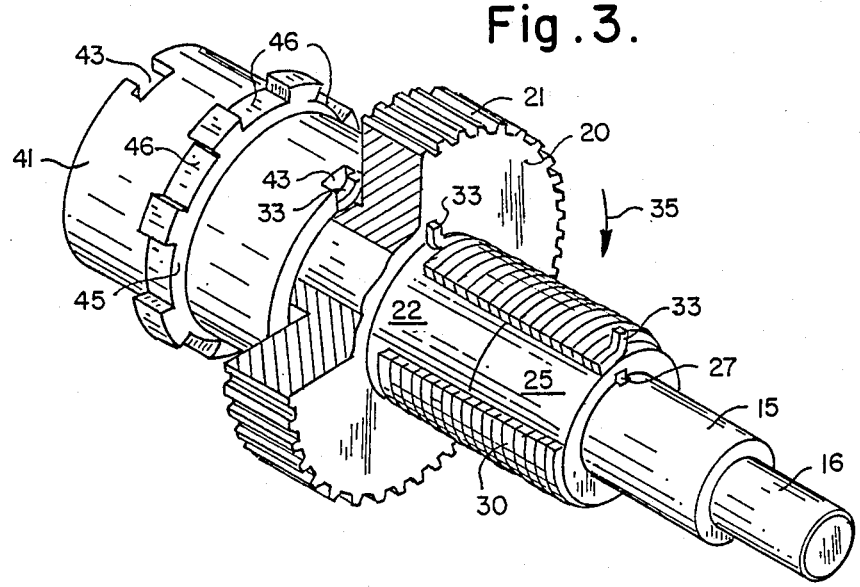
FIG. 3 is a perspective of the output shaft showing the arrangement thereon of the torque transfer bushings, the worm gear and coaxial extensions thereto, the wound springs and the control sleeves.

In accordance with the present invention, there is provided a bi-directional spring clutch apparatus for a reducing worm gear drive. Referring to FIGS. 1, 2, and 3, there is shown a reducing worm gear drive A. The worm gear drive A includes a housing 5 in which a primary drive member, shown in FIG. 2 as a worm 10 and an output shaft 15 are rotatably mounted. A secondary drive member, shown in FIG. 2 as a worm gear 20 is rotatably mounted coaxially about the output shaft 15 such that its teeth 21 mesh with the threads 11 of worm 10. One end 12 of worm 10 is adapted to receive a drive shaft from outside housing 5, such as the drive shaft from an electric or hydraulic drive motor. Likewise, one end 16 of output shaft 15 extends outside housing 5 and is adapted for connection to the mechanism to be driven by reducing worm gear drive A.

Figure 2A:
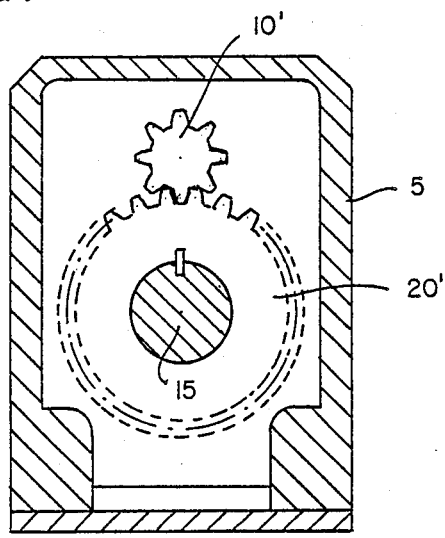
FIG. 2a is a simplified side elevational view of the spring clutch employing gears.
Figure 2B:
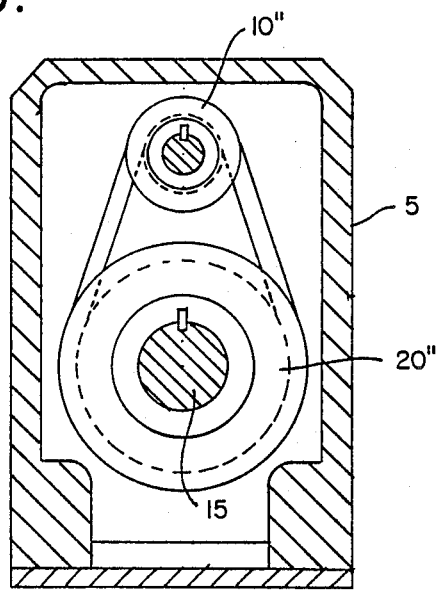
FIG. 2b is a simplified side elevational view of the spring clutch employing pulleys.
Figure 4:
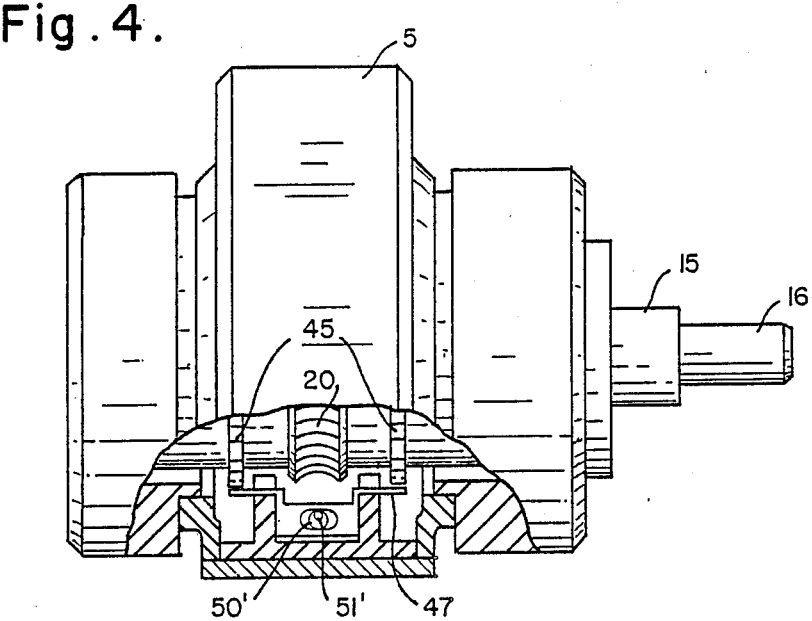
FIG. 4 is a cut away view of a slidably mounted guide bar, cam and handle.
Figure 5:
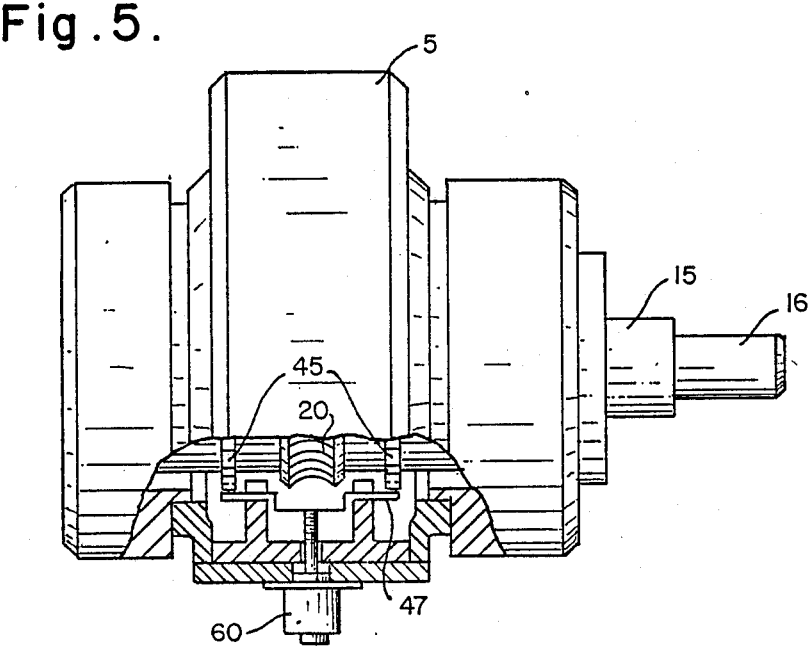
FIG. 5 is a cut away view of a guide bar and electrically powered solenoid.

Worm gear 20 has a pair of coaxial extensions 22 and 23, one on each of side of worm gear 20 itself. There are also provided a pair of torque transfer bushings 25 and 26 mounted coaxially about output shaft 15 and rotatably fixed thereto by a key or a spline 27. Torque transfer bushings 25 and 26 are located immediately next to worm gear extensions 22 and 23, respectively, and have an outside diameter equal to the outside diameter of worm gear extensions 22 and 23. In another embodiment, as seen in FIG. 2a the primary drive member is a spur gear 10', and the secondary drive member is a gear 20' of larger diameter than the gear 10'. In a third embodiment, as seen in FIG. 2b, the primary drive member is a pulley 10" and the secondary drive member is pulley 20" of larger diameter than the pulley 10".

Also provided are a pair of wound springs 310 and 31, each of the same hand of winding. Wound springs 30 and 31 are stretched over the torque transfer bushings 25 and 26/worm gear extensions 22 and 23 on each side of worm gear 20 so that the inner surfaces of said wound springs firmly contact the outer surfaces of said torque transfer bushings and worm gear extensions. The number of revolutions that springs 30 and 31 are wound about the torque transfer bushings/worm gear extensions on one side of the worm gear 20 are equal to the number on the other and are sufficient to result in self-locking of the springs 30 and 31 on the outside diameter, or contact surfaces, of torque transfer bushings 25 and 26/worm gear extensions 22 and 23 about which springs 30 and 31 are wound.

Thus, when worm gear 20 is driven by worm 10 in direction of rotation 35, wound spring 30 transmits torque by friction lock from worm gear extension 22 to the torque transfer bushing 25, while wound spring 31 on the opposite side of worm gear 20 slips and does not transmit torque from worm gear extension 23 to torque transfer bushing 26. When worm gear 20 is driven in the opposite direction, the other wound spring 31 transmits torque by friction from worm gear extension 23 on the other side of worm gear 20 to torque transfer bushing 26, while spring 30 on the first side of worm gear 20 slips. In this way, the reducing worm gear drive A of the present invention drives the output shaft 15 in either direction, depending on the direction in which worm gear 20 is being driven by worm 10.

The ends of each of wound springs 30 and 31 of the present invention are bent radially outward to form tangs 33. Thus, there are two tangs 33 for each wound spring 30 and 31. Also provided are a pair of control sleeves 40 and 41 which are rotatably mounted coaxially about the outside diameter of wound springs 30 and 31. Each control sleeve 40 and 41 has a slot 43 on each end through which each of the tangs 33 at each end of the wound springs 30 and 31 project.

Slots 43 are angularly located relative to tangs 33 and are dimensioned relative to the size of tangs 33 so as not to restrain tangs 33 of springs 30 and 31 in any way if control sleeves 40 and 41 is not rotatably controlled. If control sleeves 40 and 41 are rotatably controlled, i.e., control sleeves 40 and 41 are prevented from rotating, then tangs 33 of the spring that is transmitting torque for that particular direction of rotation will come into contact with the end surfaces of slots 43 through which tangs 33 project. This will restrain rotation and therefore torque transfer of that spring, since the friction lock of that spring on the torque transfer bushing/worm gear extension will thus be released.

Thus, by rotatably controlling control sleeves 40 and 41, worm gear 20 may be selectively coupled and uncoupled from output shaft 15. To facilitate such control, there is provided in each of control sleeves 40 and 41 a radial flange 45 into which a plurality of radially spaced notches 46 have been machined. There is further provided a guide bar 47 which is slidably or bendably mounted in housing 5 such that when it is moved upwards or its center section depressed, the ends 48 of guide bar 47 engage radial notches 46 in radial flanges 45 of control sleeves 40 and 41, thereby restraining rotation of control sleeves 40 and 41 and thereby in turn uncoupling worm gear 20 from output shaft 15. Guide bar 47 may be, by mechanical arrangements well known in the art, moved into and out of engagement with notches 46 in radial flanges 45 by a mechanical lever, cam or an electrically powered solenoid 60. The guide bar 47 can be slidably mounted in the housing 5 such that when it is slid toward the control sleeves 40, the ends engage the radially spaced notches 46 in the radial flange 45 of the control sleeve 40. The guide bar 47 can be moved in and out of engagement with the radially spaced notches 46 in the radial flange 45 of the control sleeve 40 by a cam 50' mounted on a shaft 51' rotatably mounted in the housing 5 and adapted for rotation by means of a handle (not shown) mounted on the shaft 51' or by means of an electrically powered solenoid 60.

In the preferred embodiment shown in FIG. 1, the ends 48 of guide bar 47 are biased out of engagement with notches 46 in radial flanges 45 by the normal shape of guide bar 47. The ends 48 of guide bar 47 are selectively moved into engagement with said notches 46 by means of a cam 50 mounted on a shaft 51 rotatably mounted in housing 5 and operated by means of a lever 52 mounted on shaft 51 outside housing 5. When lever 52 is pulled or pushed so as to rotate shaft 51, thereby rotating cam 50, the center section of guide bar 47 is depressed, thus causing the ends 48 thereof to move into engagement with notches 46.

Figure 1A:
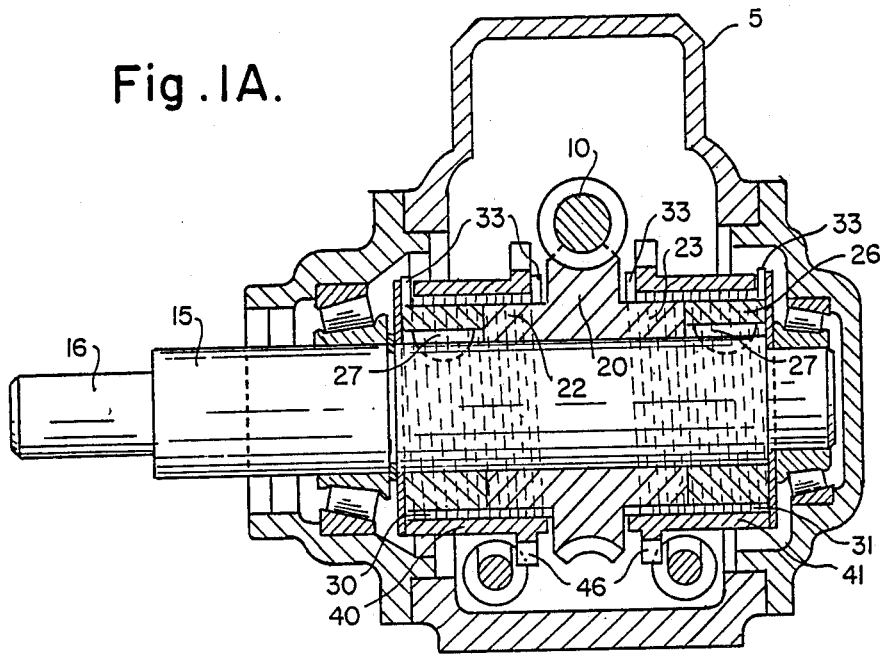
FIG. 1A is an alternate side elevational section of the worm gear drive as viewed from a direction perpendicular to the output shaft.

An alternative arrangement for controlling control sleeves 40 and 41 is shown in FIG. 1A. There, tabs 55 and 56 can be independently rotated into and out of engagement with notches 46 on shafts 57 and 58 respectively. Shafts 57 and 58 can be rotated manually by means of levers attached to them outside housing 5 or by other mechanical arrangements well known in the art. By this alternative arrangement, the control sleeves are rotatably controlled independently, thereby permitting an operator to prevent transmission of torque through the torque transfer bushing/coaxial extensions of is choice. This may be of particular advantage when the load to which the drive of the present invention is attached needs to be moved in one direction manually.

It will be understood that various changes in the details, materials and arrangement of parts which have been herein described and illustrated may be made by those skilled in the art within the principle and scope of the invention as expressed in the appended claims.

What is claimed is:

1. A bi-directional spring clutch apparatus, comprising:

an output shaft rotatably mounted in a housing and adapted at one end for coupling to an external device to which said output shaft may impart rotational force;

a secondary drive member rotatably mounted coaxially about said output shaft intermediate the ends thereof and having a pair of coaxial extensions, one on each side, which rotate coaxially about said output shaft and which are rotatably fixed relative to said secondary drive member;

a primary drive member rotatably mounted in said housing so that it is rotationally coupled to said secondary drive member and adapted at one end for coupling to an external power device for imparting rotational force to said primary drive member;

a pair of torque transfer bushings mounted coaxially about said output shaft and rotatably fixed thereto, one torque transfer bushing being located adjacent one of said coaxial extensions and the other torque transfer bushing being located adjacent to the other coaxial extension and dimensioned to have the same outside diameter as said coaxial extensions;

a pair of wound springs, each of the same hand of winding, one of which is stretched over one torque transfer bushing and one coaxial extension located adjacent thereto, the other stretched over the other torque transfer bushing and other coaxial extension located adjacent thereto, and each of which is bent radially outward at both ends thereof to form tangs;

a pair of cylindrical control sleeves, one of which is rotatably mounted coaxially about one of said wound springs, the other is rotatably mounted coaxially about the other wound spring, each control sleeve including a pair of notches through which said tangs of the corresponding wound springs projects; and stop means for controlling the rotation of said control sleeves.

2. The apparatus of claim 1 in which said primary drive member is a worm and said secondary drive member is a worm gear.

3. The apparatus of claim 1 in which said primary drive member is a gear and said secondary drive member is a gear of larger diameter than the gear comprising said primary drive member.

4. The apparatus of claim 1 in which said primary drive member is a pulley and said secondary drive member is a pulley of larger diameter than the pulley comprising said primary drive member.

5. The apparatus of claim 2 in which said stop means comprises: a. a radial flange mounted coaxially about each of said control sleeves and into which are machined a plurality of radially spaced notches; b. a guide bar bendably mounted in said housing such that when the center section of said guide bar is depressed, the ends thereof engage said radially spaced notches in each of said radial flanges of said control sleeves; and c. means for depressing said center section of said guide bar.

6. The apparatus of claim 5 in which said means for depressing said center section of said guide bar comprises a cam mounted on a shaft rotatably mounted in said housing and adapted for rotation by means of a handle mounted on said shaft outside said housing so that said cam engages said center section.

7. The apparatus of claim 2 in which said stop means comprises: a. a radial flange mounted coaxially about each of said control sleeves and into which are machined a plurality of radially spaced notches; b. a guide bar slidably mounted in said housing relative to said control sleeves such that when it is slid toward the control sleeves, the ends thereof engage said radially spaced notches in each of said radial flanges of said control sleeves; and c. means for moving said guide bar such that the ends thereof move toward and engage with said radially spaced notches.

8. The apparatus of claim 7 in which said means for moving said guide bar comprises a cam mounted on a shaft rotatably mounted in said housing and adapted for rotation by means of a handle mounted on said shaft outside said housing so that said cam engages said guide bar.

9. The apparatus of claim 7 in which said means for moving said guide bar comprises an electrically powered solenoid.

10. The apparatus of claim 2 in which said stop means comprises: a. a radial flange mounted coaxially about each of said control sleeves and into which are machined a plurality of radially spaced notches; and b. tabs mounted on shafts rotatably mounted in said housing wherein said shafts can be independently rotated so as to independently engage said tabs with said radially spaced notches.

* * * * *

UNITED STATES PATENT AND TRADEMARK OFFICE
CERTIFICATE OF CORRECTION

PATENT NO. : 4,986,400
DATED : January 22, 1991
INVENTOR(S) : Werner H. Heller

It is certified that error appears in the above-identified patent and that said Letters Patent is hereby corrected as shown below: Title page:

In the "References Cited", delete "Nishimara" and substitute --Nishimura-- therefor.

Col. 1, line 46, delete "755,404" and substitute --755,405-- therefor.

Col. 1, line 66, delete "Nos." and substitute --No.-- therefor.

Col. 6, line 12, delete "of is choice" and substitute --of choice-- therefor.

Signed and Sealed this

Twenty-seventh Day of October, 1992

Attest:

DOUGLAS B. COMER

*Attesting Officer*    Acting Commissioner of Patents and Trademarks